Feb. 21, 1950     R. A. BROWN     2,497,860
PRESSURE RELIEF VALVE
Filed Oct. 3, 1945     2 Sheets-Sheet 2
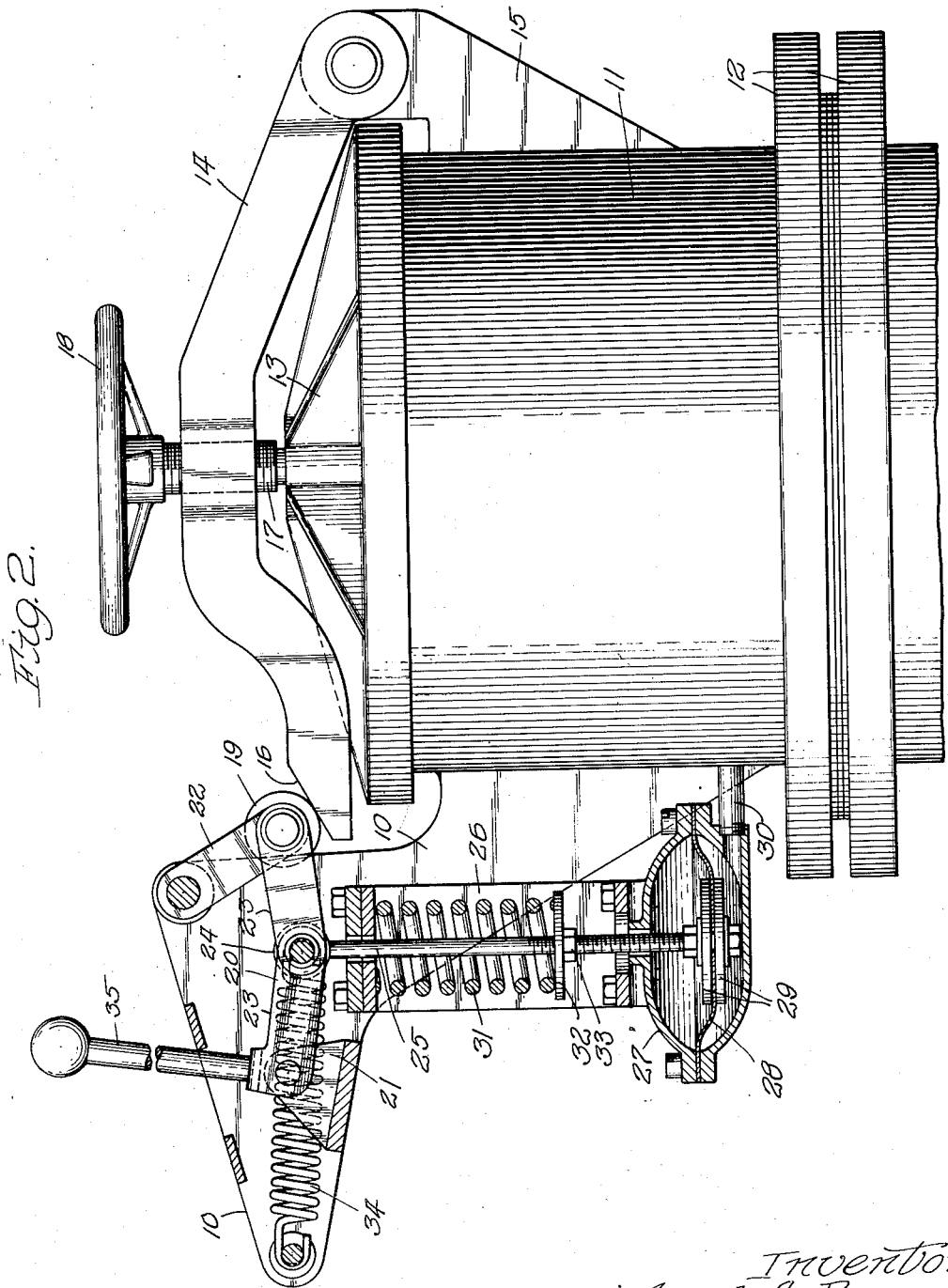
Inventor:
Richard A. Brown,
By Chritton, Wiles, Schroeder,
Merriam, & Hofgren, Attys.

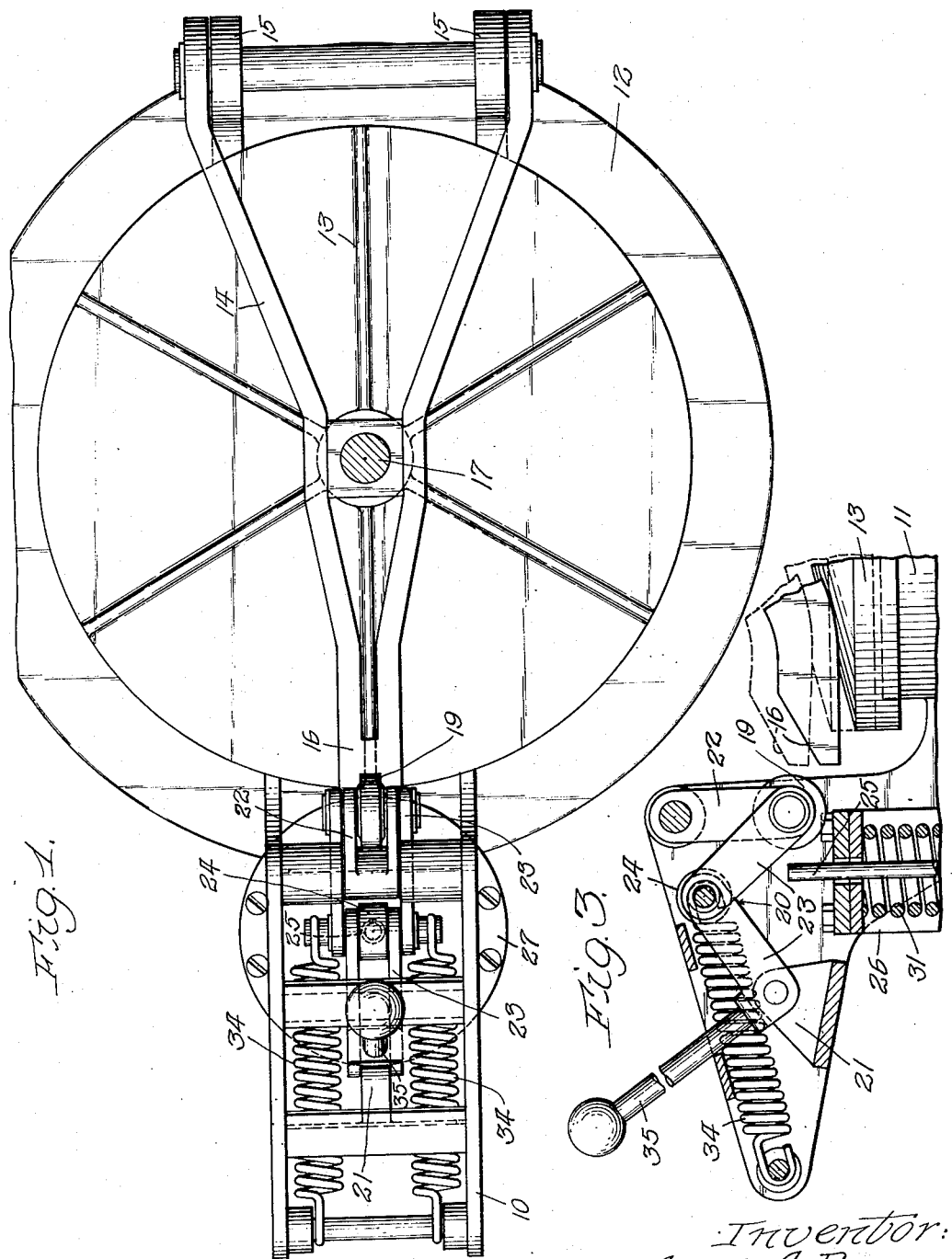

Patented Feb. 21, 1950

2,497,860

UNITED STATES PATENT OFFICE 2,497,860

PRESSURE RELIEF VALVE

Richard A. Brown, Eureka, Calif., assignor to Chicago Bridge & Iron Company, a corporation of Illinois Application October 3, 1945, Serial No. 619,991

12 Claims. (Cl. 137—53)

This invention relates to pressure relief valves, and more specially to such valves adapted for use on a pressure container. The valve may be used for example as a pressure relief vent for storage tanks containing gases or volatile liquids.

The new pressure relief valve is of very simple construction, yet has a positive action making it useful on storage tanks for relieving the internal pressure when it exceeds a predetermined value. The valve is adjustable for operation at different pressures and has a snap action, making its operation very rapid. The valve is especially useful on low pressure tanks such as low pressure spheroids, as it operates rapidly at any predetermined pressure, and this pressure may be quite low.

The invention will be described as related to the embodiment set out in the accompanying drawings. Of the drawings Fig. 1 is a plan view of the top of a tank with the pressure relief apparatus attached thereto; Fig. 2 is an elevation in vertical section taken through the pressure relief valve; and Fig. 3 is a fragmentary section similar to Fig. 2 showing the valve in released position.

The pressure relief valve shown in the accompanying drawings is mounted on a fixed support 10 attached to a hatch 11 of a storage tank. The hatch is connected to the tank by means of a pair of flanges 12. On top of the hatch 11 is located the usual cover 13 and yoke structure 14, pressing down upon the cover. The yoke structure is hingedly attached at one side of the hatch 11. The pressure relief apparatus presses against the closed end 16 of the yoke structure 14 to hold the cover normally closed. The yoke structure 14 presses down on the cover 13 through a vertical screw 17 at the center of the cover. This screw may be regulated by wheel 18 attached at its top end, and thus serves to regulate the distance between the cover 13 and the yoke structure 14. With this construction the cover 13 may be placed over the hatch 11, the yoke 14 moved into place thereover, the pressure relief apparatus moved to position to press against the closed end 16 of the yoke, and the screw 17 may then be turned by the wheel 18 to press the cover 13 into sealing contact with the hatch 11.

The pressure relief apparatus comprises a wheel 19 pressing against the closed end 16 of the yoke to hold the yoke in place. This wheel is rotatably mounted between the ends of a pair of parallel levers 20 that are attached at their ends to a bracket 21 mounted on the fixed support 10. The wheel ends of the levers 20 are mounted on parallel movable bars 22, also attached to the fixed support 10. The levers 20 are each formed of two sections 23 hingedly attached together to form a continuous lever 20. Pressing against the hinge 24 of the parallel levers 20 is a vertical rod 25 located in a cylindrical housing 26. This housing has attached to it at its lower end a chamber 27 containing a flexible diaphragm 28 of leather or the like, to which the rod 25 is attached by means of clamps 29. The diaphragm chamber 27 is in communication at its lower end with the interior of the tank by means of a pipe 30 extending from the bottom of the chamber 27 to the hatch 11. The vertical rod 25 is surrounded by a spring 31 located within the cylindrical housing 26. This spring extends between the top of the housing and a circular plate 32 mounted on the rod 25. The tension of the spring may be varied by changing the position of the plate 32. In order to accomplish this the lower end of the rod 25 is threaded and has a nut 33 thereon pressing against the plate 32. In order to provide a snap action to the pressure relief apparatus, there is provided a pair of substantially parallel springs 34 attached to the lever 20 at its central hinge 24 and to the housing 10. These springs are normally arranged at a small angle below the portion of the lever 20 that is attached to the fixed support 10.

When the tank is in operation with the cover 13 in place on the hatch 11 and the yoke structure 14 placed thereover, the wheel 19 is moved into position against the closed end 16 of the yoke structure to hold the cover tightly in place. The pressure relief apparatus is then in the position shown in Fig. 2 with the lever 20 arranged laterally at one side of an imaginary straight line connecting the two ends of the lever. The springs 34 hold the hinged portion 24 tightly against the top of the vertical rod 25. This rod then rests on the bottom of the diaphragm chamber 27. The spring 31 surrounding the rod 25 has previously been set to a desired tension. As pressure within the tank gradually increases this pressure is communicated through pipe 30 to the bottom of the diaphragm 28. Pressure on the diaphragm tends to push rod 25 upward against the hinge 24 on the lever 20. When the pressure reaches its predetermined value, the slightly bent lever 20 will be pushed past its center line and the springs 34 will cause the lever to snap upward, as shown in Fig. 3, and pull the wheel 19 away from its seat on the end 16 of the yoke 14. This releases the pressure on the cover 13 and permits the gas to escape from around the cover.

After the pressure within the tank has fallen the apparatus must be reset by hand to its normally closed position. In order to do this a hand lever 35 is provided at the end of the lever section 23 that is mounted on the support 10. The lever 35 and the section 23 are arranged at right angles to each other with the lever 35 pointed upward. When resetting the pressure relief apparatus the lever 35 is pushed to the right (Fig.

3) to move the hinged lever 20 down past its center line so that it assumes a position shown in Fig. 2 with the wheel 19 again pressing against the yoke 14 at the closed end 16 of the yoke.

Having described my invention as related to a typical embodiment of the same, it is my intention that the invention be not limited by the details of description unless otherwise specified, but rather be construed broadly within its spirit and scope as set out in the accompanying claims.

I claim:

1. A pressure relief vent for a storage tank or the like comprising a casing having an opening, a movable cover structure for closing said opening, means normally holding the cover shut including lever means fulcrumed at one end to a fixed support and at the other end to a movable support with this latter end pressing against the cover structure, and releasing means communicating with the interior of the casing for moving the movable end of the lever means out of contact with the cover structure when the pressure within the casing reaches a predetermined value, said releasing means including a member actuated by pressure within the casing to disengage the movable end of the lever means from the cover structure by shortening the effective length of said lever.

2. The relief vent of claim 1 wherein the lever means is formed of two parts hingedly connected together.

3. The relief vent of claim 1 wherein the lever means is formed of two parts hingedly connected together, and the releasing means acts upon said hinge.

4. The relief vent of claim 1 wherein the lever means is formed of two parts hingedly connected together normally arranged laterally at one side of an imaginary straight line connecting the center of the two fulcrums of the lever means when the lever is pressing against the cover structure and arranged at the opposite side of said line when the lever means is out of contact with said cover structure.

5. The relief vent of claim 1 wherein the lever means is formed of two parts hingedly connected together normally arranged laterally at one side of an imaginary straight line connecting the two ends of the lever when the lever means is pressing against the cover structure and arranged at the opposite side of said line when the lever means is out of contact with said cover structure and said lever means is held in either of the two positions by spring means whereby a snap action is imparted to the lever means on releasing the cover structure.

6. A pressure relief vent for a storage tank or the like comprising a casing having an opening, a movable cover structure for closing said opening, means normally holding the cover shut including a lever means fulcrumed at one end to a fixed support attached to the casing and at the other end to a movable support which is itself hingedly connected to the fixed support, with the lever means pressing against the cover structure at its movable end, said lever means being formed of two parts hingedly connected together normally held laterally at one side of an imaginary straight line connecting the two ends of the lever means when pressing against the cover structure and at the opposite side of said line when the lever means is out of contact with said cover structure, spring means for holding the lever means in said positions, and releasing means communicating with the interior of the casing for moving the lever means from its first lateral position to its second with the lever means having a shorter effective length in its second lateral position.

7. The pressure relief vent of claim 6 wherein the releasing means acts upon the hinge connecting the two parts of the lever means.

8. The pressure relief vent of claim 6 wherein the releasing means includes a rod means pressing against the hinge connecting the two lever parts and actuated by pressure within the casing.

9. The pressure relief vent of claim 6 wherein the releasing means includes a movable means communicating with the interior of the casing and movable by pressure therein a member attached thereto and pressing against the lever means to move it past said straight line, and an adjustable spring means resisting movement of the movable means.

10. The pressure relief vent of claim 6 wherein the releasing means includes a diaphragm communicating with the interior of the casing and movable by pressure therein, a rod attached thereto and pressing against the lever means to move it past said straight line, and an adjustable spring resisting movement of the diaphragm and attached rod.

11. A pressure relief vent for a storage tank or the like comprising a casing having an opening, a movable cover structure for closing said opening, a fixed support attached to the casing, a lever means formed of two parts hingedly connected and fulcrumed at one end to the fixed support and at the other end to an arm hingedly attached to the fixed support, said lever means pressing against the cover structure at its movable end and held laterally at one side of an imaginary straight line connecting the two ends of the lever means when pressing against the cover structure and at the opposite side of said line when the lever means is out of contact with the cover structure, spring means attached to the fixed support and to the lever means for holding the lever in said two positions, a diaphragm communicating with the interior of the casing and movable by pressure therein, a rod attached thereto and pressing against the hinge connecting the two parts of the lever when the lever means is in closed position to move the lever means past said straight line, and an adjustable spring resisting movement of the diaphragm and attached rod.

12. The pressure relief vent of claim 11 wherein the axis of the spring means forms a small angle with the center line of the portion of the lever means that is attached to the fixed support.

RICHARD A. BROWN.

REFERENCES CITED

The following references are of record in the file of this patent:

UNITED STATES PATENTS

| Number | Name | Date |
|---|---|---|
| 109,151 | Stewart | Nov. 8, 1870 |
| 1,668,001 | Bolling | May 1, 1928 |
| 2,231,059 | Douglass | Feb. 11, 1941 |
| 2,234,798 | Craig | Mar. 11, 1941 |
| 2,297,003 | Larson | Sept. 29, 1942 |

Certificate of Correction

Patent No. 2,497,860                                 February 21, 1950

RICHARD A. BROWN

It is hereby certified that errors appear in the printed specification of the above numbered patent requiring correction as follows:

Column 1, line 33, for the words "side of" read *side to*; column 3, lines 39 and 40, for "center" read *centers*; line 41, and column 4, lines 46 and 50, after "lever" insert *means*; column 3, lines 48 and 49, for "two ends" read *centers of the two fulcrums*; column 3, line 49, after "lever", first occurrence, insert *means*;

and that the said Letters Patent should be read with these corrections therein that the same may conform to the record of the case in the Patent Office.

Signed and sealed this 13th day of June, A. D. 1950.

[SEAL]

THOMAS F. MURPHY,
                                                                     *Assistant Commissioner of Patents.*